US008396943B2

(12) United States Patent
Okaya et al.

(10) Patent No.: US 8,396,943 B2
(45) Date of Patent: Mar. 12, 2013

(54) VEHICLE MOUNTED DEVICE, SERVER DEVICE, AND COMMUNICATION SYSTEM

(75) Inventors: Yoshihisa Okaya, Kyoto (JP); Mao Kishimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 275 days.

(21) Appl. No.: 12/878,824

(22) Filed: Sep. 9, 2010

(65) Prior Publication Data

US 2011/0010435 A1    Jan. 13, 2011

Related U.S. Application Data

(63) Continuation of application No. PCT/JP2009/001152, filed on Mar. 16, 2009.

(30) Foreign Application Priority Data

Apr. 23, 2008    (JP) .................................. 2008-112181

(51) Int. Cl.
    *G06F 15/16*    (2006.01)
(52) U.S. Cl. .......... 709/219; 709/200; 701/24; 348/148; 348/837
(58) Field of Classification Search .................. 709/200, 709/219; 701/24; 348/148, 837
    See application file for complete search history.

(56) References Cited

U.S. PATENT DOCUMENTS

| | | | | |
|---|---|---|---|---|
| 6,510,381 B2 * | 1/2003 | Grounds et al. | ............... | 701/517 |
| 6,982,654 B2 * | 1/2006 | Rau et al. | ....................... | 340/937 |
| 7,046,169 B2 * | 5/2006 | Bucholz et al. | ............... | 340/937 |
| 7,092,802 B2 | 8/2006 | Baldassa | | |
| 7,406,423 B2 * | 7/2008 | Kumhyr | ........................ | 704/275 |
| 7,412,078 B2 * | 8/2008 | Kim | ............................... | 382/105 |
| 7,436,431 B2 * | 10/2008 | Adachi et al. | .................. | 348/148 |
| 7,579,965 B2 * | 8/2009 | Bucholz | ........................ | 340/937 |
| 7,917,285 B2 * | 3/2011 | Rothschild | .................... | 701/420 |
| 8,174,577 B2 * | 5/2012 | Chou | ............................ | 348/148 |
| 2002/0041240 A1 * | 4/2002 | Ikeda et al. | .................... | 340/993 |
| 2004/0177253 A1 * | 9/2004 | Wu et al. | ....................... | 713/176 |
| 2004/0257208 A1 * | 12/2004 | Huang et al. | ............... | 340/426.1 |
| 2005/0066371 A1 * | 3/2005 | Lu | .................................. | 725/105 |
| 2007/0279209 A1 * | 12/2007 | Kogan et al. | .................. | 340/506 |
| 2008/0204555 A1 * | 8/2008 | Hughes | ......................... | 348/148 |
| 2009/0058845 A1 * | 3/2009 | Fukuda et al. | ................. | 345/214 |
| 2009/0231429 A1 * | 9/2009 | Hardee et al. | ................ | 348/148 |
| 2009/0290022 A1 * | 11/2009 | Uhm | ............................. | 348/148 |
| 2010/0157061 A1 * | 6/2010 | Katsman et al. | .............. | 348/149 |
| 2010/0235400 A1 * | 9/2010 | Myers et al. | .................. | 707/802 |
| 2011/0258431 A1 * | 10/2011 | Gundavelli et al. | ........... | 713/150 |

FOREIGN PATENT DOCUMENTS

| | | |
|---|---|---|
| JP | 6-121303 | 4/1994 |
| JP | 2003-069471 | 3/2003 |
| JP | 2003-153341 | 5/2003 |
| JP | 2004-349800 | 12/2004 |
| JP | 2005-260348 | 9/2005 |

* cited by examiner

*Primary Examiner* — John Follansbee
*Assistant Examiner* — Anthony Mejia
(74) *Attorney, Agent, or Firm* — McDermott Will & Emery LLP

(57) ABSTRACT

A first local communication part of a vehicle mounted device transmits a first data including at least one of a first video data or a first audio data generated by an AV input/output unit of the vehicle mounted device to a server device. The first local communication unit receives a second data including at least one of a second video data or a second audio data from the server device. A first recording unit of the vehicle mounted device records therein the first data, the second data, and a unique information relating to a vehicle or a user of the vehicle. The first local communication unit further transmits the unique information to the server device.

28 Claims, 9 Drawing Sheets

F I G. 1
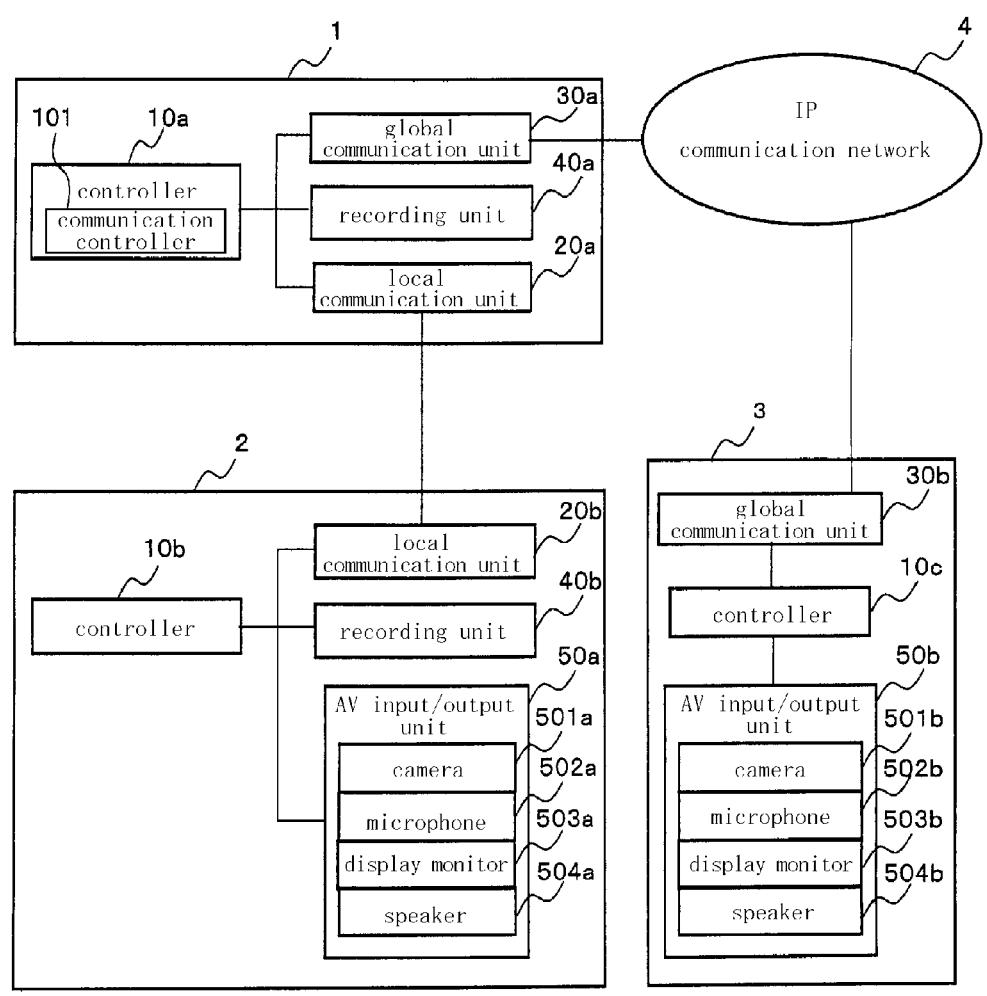

F I G. 5
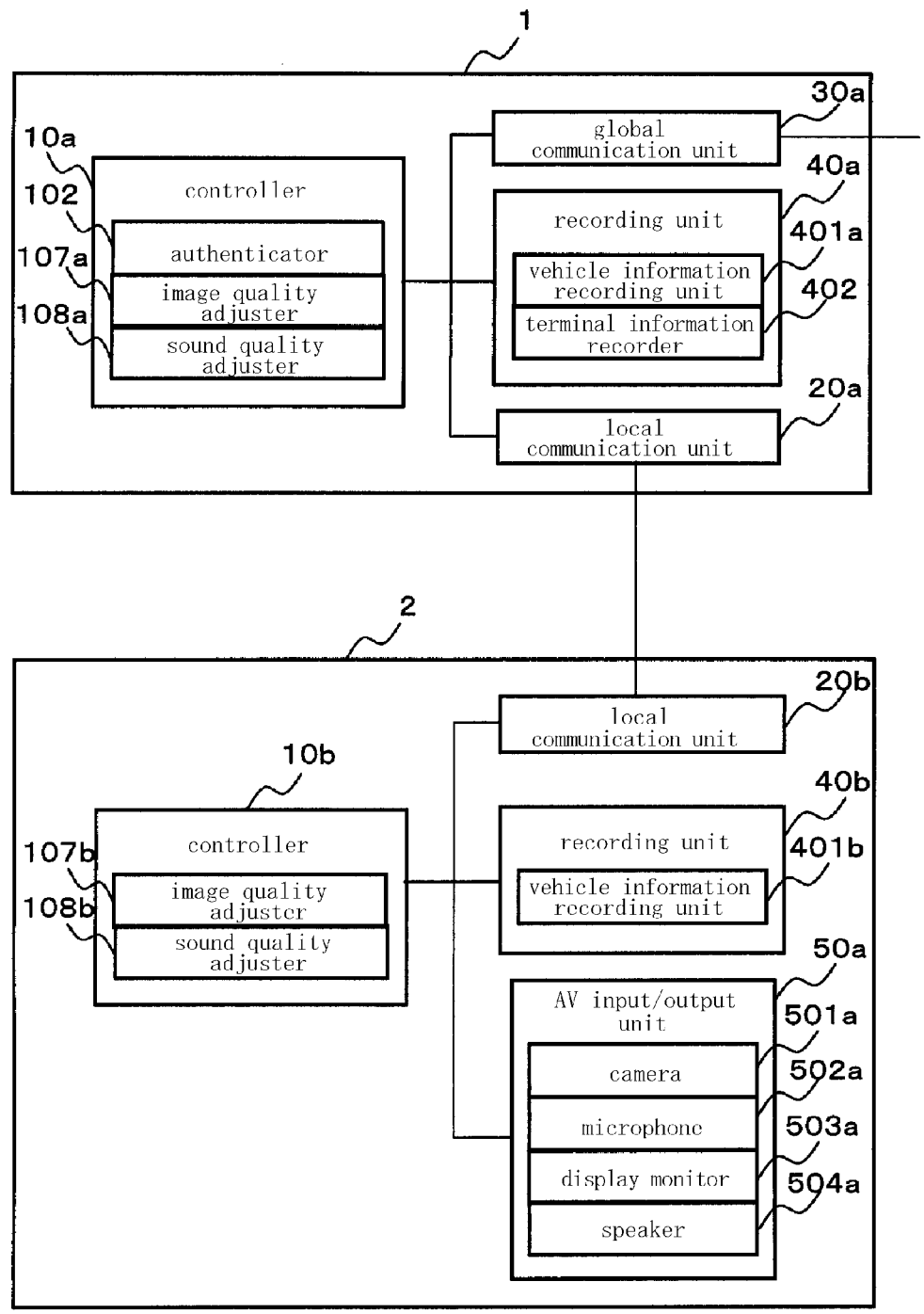

F I G. 8
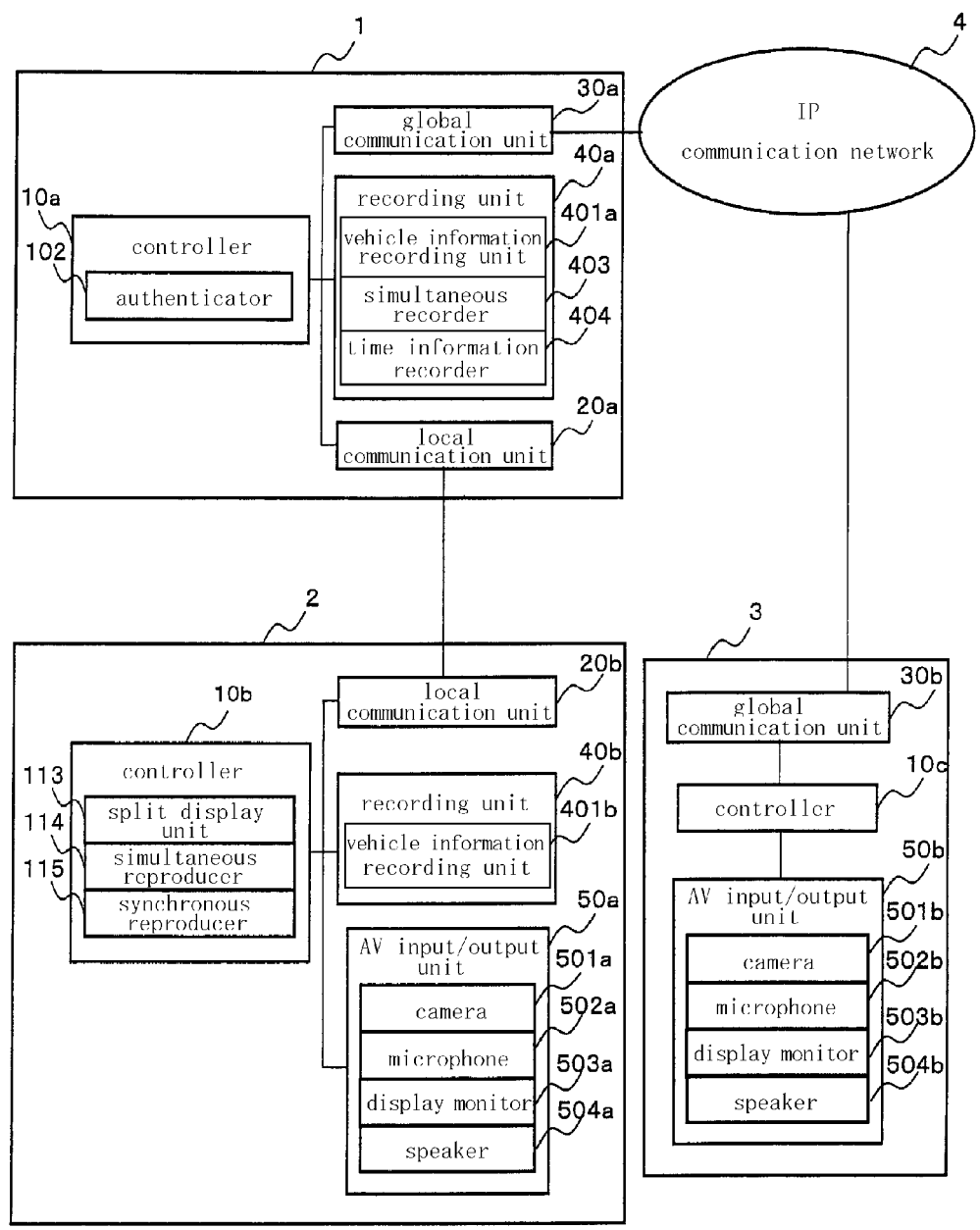

VEHICLE MOUNTED DEVICE, SERVER DEVICE, AND COMMUNICATION SYSTEM

CROSS-REFERENCE TO RELATED APPLICATION

This is a continuation of PCT International Application PCT/JP2009/001152 filed on Mar. 16, 2009, which claims priority to Japanese Patent Application No. 2008-112181 filed on Apr. 23, 2008. The disclosures of these applications including the specifications, the drawings, and the claims are hereby incorporated by reference in their entirety.

FIELD OF THE INVENTION

The present invention relates to a vehicle mounted device, a server device and a communication system, more particularly to an authentication technique when a vehicle mounted device communicates with a server device, and a communication technique which utilizes currently available networks.

BACKGROUND OF THE INVENTION

In some known conventional information communication apparatuses, communication systems and communication methods, a user of the information communication apparatus in the communication system is supplied with information which identifies the user (hereinafter, referred to as communication addressee information). In the event that the user owns a plurality of information communication apparatuses and changes the information communication apparatus he is currently using to another one during ongoing communication, he can continue the communication as an identified user (hereinafter, referred to as communication shift) (for example, see the Patent Document 1). Examples of the communication addressee information are telephone number and IP address.

Patent Document: Japanese Patent Applications Laid-Open No. 2005-260348 (for example, see Page 1, FIG. 1)

DISCLOSURE OF THE INVENTION

Problem to be Solved by the Invention

In an information communication system including a device used to mount an information communication apparatus in a vehicle (hereinafter, referred to as vehicle mounted device), however, there are the following problems. Some of the vehicle mounted devices have their own network communication system built for inter-device communication. Such a network communication is conventionally a unique system independently developed by the maker of the vehicle mounted devices. Therefore, the communication shift is a difficult task between the vehicle mounted device equipped with the network communication system and any other currently available information communication apparatuses (where telephone network or IP communication network is used). Another problem is difficulty in the communication shift in some of the vehicle mounted devices not yet equipped with an established system for assigning communication addressees.

Means for Solving the Problems

A vehicle mounted device according to the present invention is a device mounted in a vehicle, comprising:

an AV input/output unit including at least a camera, a microphone, a display monitor, and a speaker;

a first local communication unit for transmitting a first data including at least one of a first video data and a first audio data generated by the AV input/output unit to a server device, the first local communication unit further receiving a second data including at least one of a second video data and a second audio data from the server device;

a first recording unit for recording therein the first data and the second data; and a first controller for controlling the AV input/output unit, the first recording unit, and the first local communication unit, wherein the first recording unit further records therein a unique information which can identify the vehicle or a user of the vehicle, and the first local communication unit transmits the unique information to the server device.

According to the vehicle mounted device having the structural elements thus technically characterized, a communication addressee can be assigned to each of the vehicle mounted devices provided in different vehicles based on the unique information recorded in the vehicle information recording unit. As a result, the vehicle mounted devices are able to communicate with each other through the server device.

In the vehicle mounted device according to a mode of the present invention, the first local communication unit receives a communication addressee information indicating a communication addressee uniquely assigned to the vehicle mounted device from the server device, and the first local communication unit imparts the communication addressee information to the first data to be transmitted to the server device.

In the vehicle mounted device according to another mode of the present invention, the unique information includes at least one of a car registration number plate information and a car number plate information.

According to the technical feature, the communication addressee can be uniquely assigned to each vehicle mounted device based on the unique information (car registration number plate and vehicle number plate). As a result, the vehicle mounted devices are able to communicate with each other while avoiding overlap of the communication addressees therebetween.

In the vehicle mounted device according to still another mode of the present invention, the first controller includes an encryptor for encrypting the first data using the unique information recorded in the first recording unit.

According to the technical feature, information leak to a third party can be prevented from happening in data transmission.

Preferably, the encryptor selectively encrypts a data region of the first data where an information indicating data type and characteristics of the first data is stored. This reduces processing burdens imposed on the vehicle mounted device in computing and network communication as well as avoiding information leak to a third party in data transmission.

In the vehicle mounted device according to still another mode of the present invention, the second data is encrypted by an encryption technique similar to the first data, and the first controller further includes a decryptor for decrypting the second data using the unique information recorded in the first recording unit.

According to the technical feature, the vehicle mounted device can obtain original data before encrypted in the server device.

In the vehicle mounted device according to still another mode of the present invention, the first data includes the first video data, the second data includes the second video data, and the first controller further includes a first image quality adjuster for changing image qualities of the first and second video data.

According to the technical feature, when the second video data with a high bit rate obtained from the server device is stream-reproduced, for example, the image qualities are adjusted depending on the status of communication at the time, so that drop of image frames during the stream reproduction can be avoided.

In the vehicle mounted device according to still another mode of the present invention, the first data includes the first audio data, the second data includes the second audio data, and the first controller further includes a first sound quality adjuster for changing sound qualities of the first and second audio data.

According to the technical feature, when the second audio data with a high bit rate obtained from the server device is stream-reproduced, for example, the sound qualities are adjusted depending on the status of communication at the time, so that a break in sound can be prevented from happening during reproduction.

In the vehicle mounted device according to still another mode of the present invention, the second data includes the second video data, and the first controller further includes a received image switcher, wherein the received data changer stores a first still image data and outputs the second data read from the first recording unit to the AV input/output unit while switching to and from the second video data included in the second data and the first still image data depending on needs.

This technical feature can lessen disturbance of images by temporarily displaying images based on the first still image data in the event that the vehicle mounted device fails to communicate well enough with the server device during the stream reproduction.

In the vehicle mounted device according to still another mode of the present invention, the first data includes the first video data, and the first controller further includes a transmitted image switcher, wherein the transmitted data changer stores a second still image data and outputs the first data to the server device by way of the first local communication unit while switching to and from the first video data included in the first data and the second still image data depending on needs.

This technical feature can lessen burdens during communication by temporarily transmitting the second still image data to the server device in the event that the vehicle mounted device fails to communicate well enough with the server device.

In the vehicle mounted device according to still another mode of the present invention, the first data includes the first video data, the second data includes the second video data, and the first controller further includes: a simultaneous reproducer for simultaneously reproducing a plurality of the first and second video data respectively included in the first and second data recorded in the first recording unit; and a split display unit for synthesizing the plurality of the first and second video data simultaneously reproduced by the simultaneous reproducer into a synthesized video data which can be displayed on the display monitor of the AV input/output unit in a split manner.

According to the technical feature, a plurality of video data can be reproduced and displayed on the display monitor of the AV input/output unit at a time.

In the vehicle mounted device according to still another mode of the present invention, the second data includes the second audio data, and the first controller further includes a first sounding body detector, wherein the first sounding body detector analyzes the second audio data to identify a sounding body of the analyzed second audio data.

According to the technical feature, in the case where the display monitor of the AV input/output unit has too a small display screen to visually confirm the split images displayed thereon at a time, an image of the sounding body (for example, person who makes the sound) is enlarged to increase the viewability on the screen.

A server device according the present invention comprises:
a second local communication unit for communicating with the vehicle mounted device according to the present invention;
a global communication unit to be constantly connected to a network including at least one of telephone network and IP communication network to transmit and receive data;
a second recording unit for recording therein the first and second data; and
a second controller for controlling the second recording unit, the global communication unit, and the second local communication unit, wherein
the second controller includes a communication controller, and the communication controller carries out the following processing steps:
receive the second data from an information communication apparatus connected through the network by way of the global communication unit and record the received second data in the second recording unit;
identify the vehicle mounted device based on the unique information received by the second local communication unit and record the first data of the vehicle mounted device received by the second local communication unit in the second recording unit;
read the first data from the second recording unit and identify the vehicle mounted device relevant to the read first data, and then transmit the read first data to the information communication apparatus by way of the global communication unit; and
read the second data from the second recording unit and transmit the read second data to the identified vehicle mounted device by way of the second local communication unit.

According to the server device thus technically characterized, communication services can be provided between the vehicle mounted device and the information communication apparatus through the network.

In the server device according to a mode of the present invention, the communication controller transmits the communication addressee information to the vehicle mounted device by way of the second local communication unit, and the communication controller identifies the vehicle mounted device based on the communication addressee information imparted to the first data.

In the server device according to another mode of the present invention, the second controller includes a communication selector, wherein, when the second local communication unit is connected to the vehicle mounted device and the global communication unit is connected to the information communication apparatus through the network to allow communication therebetween, the communication selector arbitrarily selects one of communication with the vehicle mounted device and communication with the information communication apparatus.

The server device thus technically characterized can shift the communication currently ongoing with the vehicle mounted device to communication with the information communication apparatus. After the communication shift, a user can carry the information communication apparatus out of the vehicle to continue the communication. After the information communication device is brought back to the vehicle, the communication can start again between the server device and the vehicle mounted device.

In the server device according to still another mode of the present invention, the second recording unit records the unique information received from the vehicle mounted device, and the second controller includes an encryptor/decryptor, wherein the encryptor/decryptor decrypts the first data recorded in the second recording unit using the unique information recorded in the second recording unit, and encrypts the second data recorded in the second recording unit using the unique information recorded in the second recording unit.

The server device thus technically characterized can prevent information leak to a third party in data transmission and reception.

In the server device according to still another mode of the present invention, the first data includes the first video data, and the second data includes the second video data, wherein the second controller further includes a second image quality adjuster for changing image qualities of the first and second video data.

The server device thus technically characterized can reduce processing burdens imposed thereon during network communication by adjusting the image qualities depending on the status if communication at the time when, for example, video data with a high bit rate is stream-distributed.

In the server device according to still another mode of the present invention, the first data includes the first audio data, and the second data includes the second audio data, wherein the second controller further includes a second sound quality adjuster for changing sound qualities of the first and second audio data.

The server device thus technically characterized can reduce processing burdens imposed thereon during network communication by adjusting the image qualities depending on the status of communication at the time when audio data with a high bit rate is stream-distributed.

In the server device according to still another mode of the present invention, the second recording unit further records therein a performance information indicating a performance of the vehicle mounted device and a performance of the information communication apparatus communicatably connected thereto through the network.

The server device thus technically characterized enables such flexible data transmission that depends on the performance of the information communication apparatus, for example, image data can be transmitted to an apparatus after its image size is converted into a display size of the apparatus.

In the server device according to still another mode of the present invention, the first data includes the first video data, the second data includes the second video data, and the second controller further includes a moving image/still image switcher, wherein the moving image/still image selector stores therein a third still image data and reads the second data from the second recording unit, and then transmits the second data to the vehicle mounted device by way of the second local communication unit while switching to and from the second video data included in the second data and the third still image data depending on needs, and the moving image/still image switcher stores therein a fourth still image data and reads the first data from the second recording unit, and then transmits the first data to the information communication apparatus by way of the global communication unit while switching to and from the first video data included in the first data and the fourth still image data depending on needs.

This technical feature can lessen burdens in communication by temporarily transmitting the third and fourth still images in the event that the server device fails to communicate well enough with the information communication apparatus and the vehicle mounted device.

In the server device according to still another mode of the present invention, the second recording unit records a plurality of the first and second data at a time, and the second controller further includes a second sounding body detector, wherein the second sounding body detector analyzes a plurality of the first and second audio data included in the plurality of the first and second data recorded in the second recording unit and identifies a sounding body of the analyzed the first and second audio data.

According to the technical feature, when the first and second data recorded in the second recording unit are stream-distributed, an image of the sounding body (for example, person who makes the sound) is enlarged to increase the viewability on the screen.

A communication system according to the present invention comprises:

a plurality of the vehicle mounted devices according to the present invention;

the server device according to the present invention; and a plurality of information communication apparatuses connected to the global communication unit through the network to enable data transmission and reception therebetween, wherein communication transfer requesters for transmitting a first request to the server device are respectively provided in the vehicle mounted devices and the information communication apparatuses, the first request being requested by one of the communication transfer requesters to shift communication currently ongoing between the server device and the vehicle mounted device or the information communication apparatus provided with the one of the communication transfer requesters to communication between the server device and the other vehicle mounted device or the other information communication apparatus, and the communication selector of the server device which receives the first request selects one of communication with the vehicle mounted device and communication with the information communication apparatus depending on the first request.

According to the technical feature, the communication currently established between the vehicle mounted device and the server device can be shifted to the communication between the information communication apparatus and the server device based on the operation of the vehicle mounted device so that the communication can be continued outside the vehicle by using the information communication apparatus. Further, the communication between the vehicle mounted device and the server device can be reestablished based on the operation of the information communication apparatus.

Another communication system according to the present invention comprises:

a plurality of the vehicle mounted devices according to the present invention;

the server device according to the present invention; and a plurality of information communication apparatuses connected to the global communication unit through the network to enable data transmission and reception therebetween, wherein communication acceptance requesters for transmitting a second request to the server device are respectively provided in the vehicle mounted devices and the information communication apparatuses, the second request being requested by one of the communication acceptance requesters to shift communication currently ongoing between the server device and the other vehicle mounted device or the other information communication apparatus to communication between the server device and the vehicle mounted device or the information communication apparatus provided with the one of the communication acceptance requesters, and the communication selector of the server device which receives the second request selects one of communication with the vehicle mounted device and communication with the information communication apparatus depending on the second request.

According to the technical feature, the communication currently established between the vehicle mounted device and the server device can be shifted to the communication between the information communication apparatus and the server device based on the operation of the information communication apparatus so that the communication can be continued outside the vehicle through the information communication apparatus. Further, the communication between the vehicle mounted device and the server device can be reestablished based on the operation of the information communication apparatus.

The information communication apparatus is preferably a mobile telephone terminal or a teleconference terminal. When the communication between the server device and the mobile telephone terminal or the teleconference terminal is shifted to the communication between the server device and the vehicle mounted device, a telephone call or a teleconference can be continued in the vehicle.

Still another communication system communication system according to the present invention comprises:

the vehicle mounted device according to the present invention; and the server device according to the present invention, wherein the second recording unit of the server device records therein the unique information, and the second controller of the server device further includes an authenticator for authenticating the vehicle based on the unique information.

The communication system thus technically characterized can assure security in communication between the vehicle mounted device and the server device by authenticating the vehicle mounted device based on the unique information.

Still another communication system according to the present invention comprises:

the vehicle mounted device according to the present invention; and the server device according to the present invention, wherein the first controller of the vehicle mounted device further includes a synchronous reproducer for synchronously reproducing a plurality of the first and second data based on recording (imaging) start time or recording (imaging) end time information of the first and second video data included in the plurality of the first and second data, and the second recording unit of the server device further includes a time information recorder for recording the first and second data received by the second local communication unit and the global communication unit with the recording (imaging) start time and recording (imaging) end time information appended thereto.

According to the technical feature, wherein the server device stream-distributes a plurality of video data and audio data with the recording (imaging) start time and recording (imaging) end time information thereof appended thereto, when a plurality of first and second data received by the vehicle mounted device are reproduced at a time, the respective data can be synchronously reproduced.

Effect of the Invention

The present invention can accomplish, through currently available networks such as telephone network and IP communication network, communication with higher security by authenticating a vehicle mounted device and encrypting and decrypting data, reduction of burdens in network communication, flexible communication shift between devices, and synchronous distribution of a plurality of teleconference record data.

BRIEF DESCRIPTION OF THE DRAWINGS

FIG. 1 is a block diagram illustrating a structure of a communication system according to an exemplary embodiment 1 of the present invention.

FIG. 5 is a block diagram illustrating a structure of a communication system according to an exemplary embodiment 5 of the present invention.

FIG. 8 is a block diagram illustrating a structure of a communication system according to an exemplary embodiment 8 of the present invention.

Figure 2:
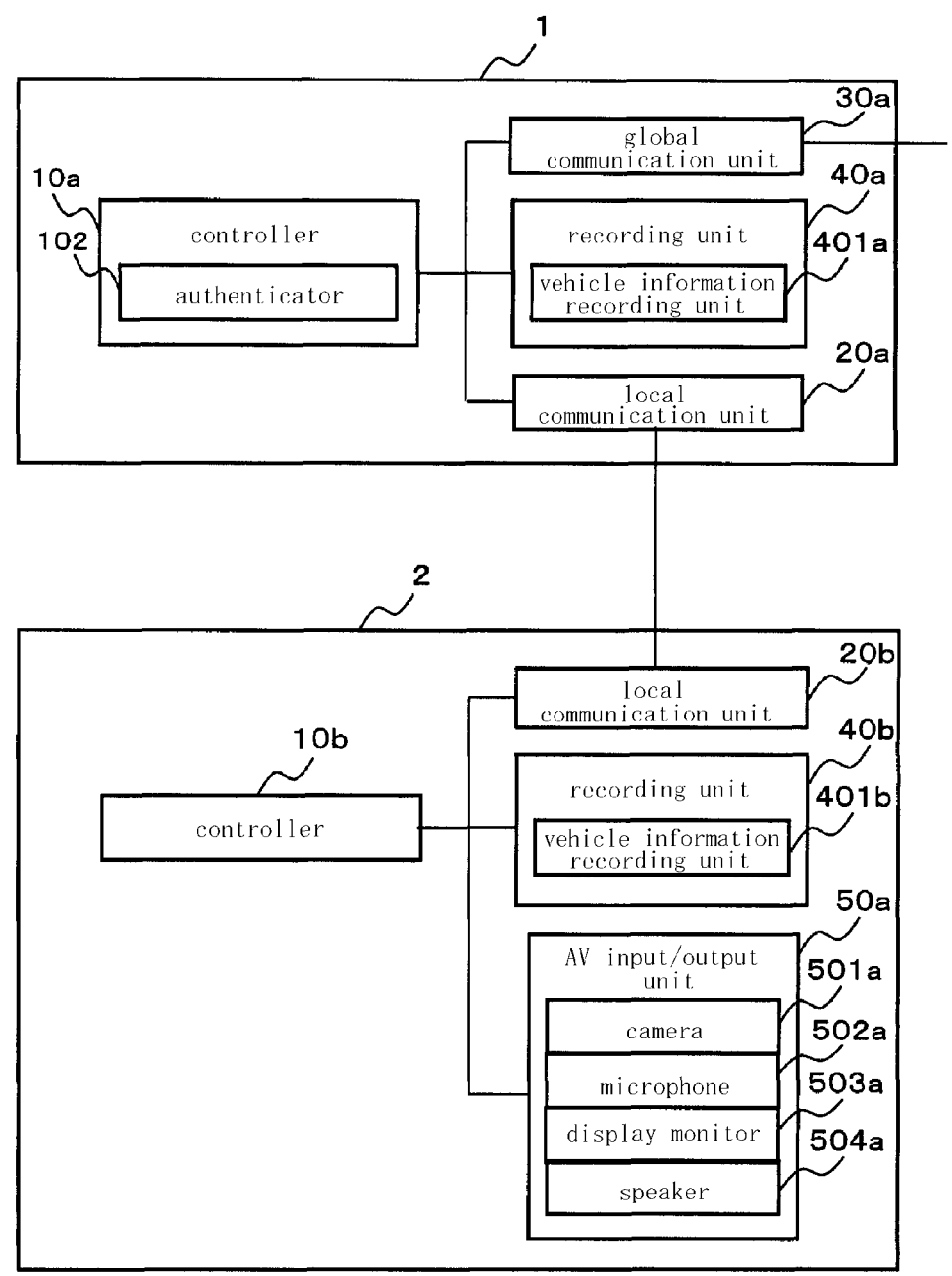
FIG. 2 is a block diagram illustrating a structure of a communication system according to an exemplary embodiment 2 of the present invention.

DESCRIPTION OF REFERENCE SYMBOLS 1 vehicle mounted server device
2 vehicle mounted device
3 information communication apparatus
4 IP communication network
5 mobile telephone terminal
6 teleconference terminal
10a controller (second controller)
10b controller (first controller)
10c controller
20a local communication unit (second local communication unit)
20b local communication unit (first local communication unit)
30a global communication unit
30b global communication unit
40a recording unit (second recording unit)
40b recording unit (first recording unit)
50a AV input/output unit 50b AV input/output unit
101 communication controller
102 authenticator
103 encryptor/decryptor
104 encryptor
105 decryptor
106 communication shift processor
107a image quality adjuster (second image quality adjuster)
107b image quality adjuster (first image quality adjuster)
108a sound quality adjuster (second sound quality adjuster)
108b sound quality adjuster (first sound quality adjuster)
109 moving image/still image switcher
110 received image switcher
111 transmitted image switcher
112a sounding body detector (second sounding body detector)
112b sounding body detector (first sounding body detector)
113 split display unit
114 simultaneous reproducer
115 synchronous reproducer
201 communication transfer requester
202 communication acceptance requester
301 communication transfer requester
302 communication acceptance requester
401a vehicle information recorder
401b vehicle information recorder
402 terminal information recorder
403 simultaneous recorder
404 time information recorder
501a camera
501b camera
502a microphone
502b microphone
503a display monitor
503b display monitor
504a speaker
504b speaker

BEST MODES FOR CARRYING OUT THE PRESENT INVENTION

Hereinafter, exemplary embodiments of a vehicle mounted device, a vehicle mounted server device, and a communication system according the present invention are described referring to the accompanied drawings. In the drawings, structural elements illustrated with the same reference symbols carry out similar operations, and redundant description of such similar structural elements may be omitted. In the description below, data transmitted from a vehicle mounted device to a vehicle mounted server device and then transmitted to an information communication apparatus is called a first data, and data transmitted from the information communication apparatus to the vehicle mounted server device and then transmitted to the vehicle mounted device is called a second data. The first data includes a first video data and a first audio data, and the second data includes a second video data and a second audio data. A controller, a recording unit, a local communication unit, an image quality adjuster, a sound quality adjuster, and a sounding body detector provided in the vehicle mounted device respectively represent a first controller, a first recording unit, a first local communication unit, a first image quality adjuster, a first sound quality adjuster, and a first sounding body detector recited in the Scope of Claims of the present invention. A controller, a recording unit, a local communication unit, an image quality adjuster, a sound quality adjuster, and a sounding body detector provided in the vehicle mounted server device respectively represent a second controller, a second recording unit, a second local communication unit, a second image quality adjuster, a second sound quality adjuster, and a second sounding body detector recited in the Scope of Claims of the present invention.

Exemplary Embodiment 1

FIG. 1 is a block diagram illustrating a structure of a communication system according to an exemplary embodiment 1 of the present invention. The communication system includes a vehicle mounted server device 1, a vehicle mounted device 2, an information communication apparatus 3, and an IP communication network 4. The vehicle mounted server device 1 includes a controller 10a, a local communication unit 20a, a global communication unit 30a, and a recording unit 40a. The vehicle mounted device 2 includes a controller 10b, a local communication unit 20b, a recording unit 40b, and an AV input/output unit 50a. The information communication apparatus 3 includes a controller 10c, a global communication unit 30c, and an AV input/output unit 50b.

The controller 10a includes a communication controller 101. The controller 10a conventionally includes, for example, a MPU and a memory. A software program is conventionally used to execute processing steps of the controller 10a, and the software is recorded in a recording medium such as ROM. In place of the software, a hardware device (dedicated circuit) may be used. The controllers 10b and 10c are configured in a manner similar to the controller 10a.

The recording units 40a and 40b may be non-volatile recording media or volatile recording media. There is no particularly predefined process for recording data in the recording units 40a and 40b. Examples of the recording process are:
 data is recorded in the recording units 40a and 40b from a recording medium;
 data transmitted via a communication circuit is recorded in the recording units 40a and 40b; and
 data inputted by an input device recorded in the recording units 40a and 40b.

The AV input/output unit 50a includes a camera 501a, a microphone 502a, a display monitor 503a, and a speaker 504a. The AV input/output unit 50b includes a camera 501b, a microphone 502b, a display monitor 503b, and a speaker 504b. An operation of the communication system according to the exemplary embodiment 1 is described in detail below.

[Data Transmission From Information Communication Apparatus To Vehicle Mounted Device]

In the AV input/output unit 50b of the information communication apparatus 3, obtained pictures and sounds are converted into signals by the camera 501b and the microphone 502b to generate video signals and audio signals. The video signals and audio signals thus generated are data-processed by the controller 10c. Hereinafter, video data and audio data thus obtained from the data processing are respectively called a second video data and a second audio data, and the second video data and the second audio data are collectively called a second data. The second data conventionally includes both of the second video data and the second audio data, however, the present invention is feasible as far as the second data includes at least one of these data.

The controller 10c transmits the second data to a communication addressee (vehicle mounted device 2 in this data transmission) by way of the global communication unit 30b. The transmitted second data is temporarily received by the global communication unit 30a of the vehicle mounted server device 1 by way of the IP communication network 4.

In the vehicle mounted server device 1, the communication controller 101 of the controller 10a stores the received second data in the recording unit 40a. After that, when the vehicle mounted device 2 which is the communication addressee and the vehicle mounted server device 1 are connected to each other through the network, the communication controller 101 transmits the second data stored in the recording unit 40a to the vehicle mounted device 2 by way of the local communication unit 20a.

The vehicle mounted device 2 receives the second data by way of the local communication unit 20b, and the controller 10b outputs the second video data and the second audio data included in the second data to the display monitor 503a and the speaker 504a of the AV input/output unit 50a.

[Data Transmission From Vehicle Mounted Device To Information Communication Apparatus]

In the AV input/output unit 50a of the vehicle mounted device 2, obtained pictures and sounds are converted into signals by the camera 501a and the microphone 502a to generate video signals and audio signals. The video signals and audio signals thus generated are data-processed by the controller 10b. Hereinafter, video data and audio data thus obtained from the data processing are respectively called a first video data and a first audio data, and the first video data and the first audio data are collectively called a first data. The first data conventionally includes both of the first video data and the first audio data, however, the present invention is feasible as far as the first data includes at least one of these data.

When the vehicle mounted device 2 is connected to the vehicle mounted server device 1 through the network, the controller 10b transmits the first data to a communication addressee (information communication apparatus 3 in this data transmission) by way of the local communication unit 20b. The transmitted first data is temporarily received by the local communication unit 20a of the vehicle mounted server device 1.

In the vehicle mounted server device 1, the communication controller 101 of the controller 10a stores the received first data in the recording unit 40a. Then, the communication controller 101 transmits the first data stored in the recording unit 40a to the IP communication network 4 by way of the global communication unit 30a. The first data transmitted to the IP communication network 4 is received by the global communication unit 30b of the information communication apparatus 3.

In the information communication apparatus 3, the controller 10c outputs the first video data and the first audio data included in the received first data to the display monitor 503b and the speaker 504b of the AV input/output unit 50b.

As described so far, according to the exemplary embodiment 1, the video and audio data can be transmitted and received to and from the vehicle mounted device 2 and the information communication apparatus 3 through the IP communication network 4 currently available.

Exemplary Embodiment 2

FIG. 2 is a block diagram illustrating a structure of a communication system according to an exemplary embodiment 2 of the present invention. The communication system includes structural elements similar to those of the exemplary embodiment 1 illustrated in FIG. 1. In addition to these structural elements, the controller 10a of the vehicle mounted server device 1 further includes an authenticator 102, the recording unit 40a of the vehicle mounted server device 1 further includes a vehicle information recorder 401a, and the recording unit 40b of the vehicle mounted device 2 further includes a vehicle information recorder 401b. Any other structural elements are similar to those illustrated in FIG. 1. The similar structural elements will not be described again but are simply shown with the same reference symbols. An operation of the communication system according to the exemplary embodiment 2 is described in detail below. The exemplary embodiment 2 is technically characterized in an authentication process when the network connection starts between the vehicle mounted device and the vehicle mounted server device. The description given below, therefore, focuses on the process when the network connection starts, while omitting processing steps after the network connection is established which are similar to the exemplary embodiment 1 (data communication between the information communication apparatus and the vehicle mounted device).

[Processing When Network Connection Starts Between Vehicle Mounted Device and Vehicle Mounted Server Device]

When the network connection starts between the vehicle mounted server device 1 and the vehicle mounted device 2, the controller 10b of the vehicle mounted device 2 transmits a unique data including a car registration number plate information or a car number plate information recorded in the vehicle information recorder 401b of the recording unit 40b as the first data to the vehicle mounted server device 1 by way of the local communication unit 20b.

When the local communication unit 20a of the vehicle mounted server device 1 receives a unique information from the vehicle mounted device 2, the authenticator 102 of the controller 10a compares the received unique information to the unique information recorded in the vehicle information recorder 401a of the recording unit 40a (car registration number plate information or car number plate information). In the case where the authenticator 102 determines that they are the same information, the controller 10a starts various communication services between the vehicle mounted server device 1 and the vehicle mounted device 2. In the case where the authenticator 102 determines that they are not the same information, the controller 10a terminates the network connection between the vehicle mounted server device 1 and the vehicle mounted device 2.

As described so far, according to the exemplary embodiment 2, the vehicle mounted server device 1 and the vehicle mounted device 2 can ensure security when they communicate with each other through the network. Another advantage of the exemplary embodiment 2 is to be able to assign communication addressees to a plurality of vehicle mounted devices without duplication by using the data of car registration number plates, which is the data unique to each vehicle, as information which identifies the communication addressees.

Exemplary Embodiment 3

Figure 3:
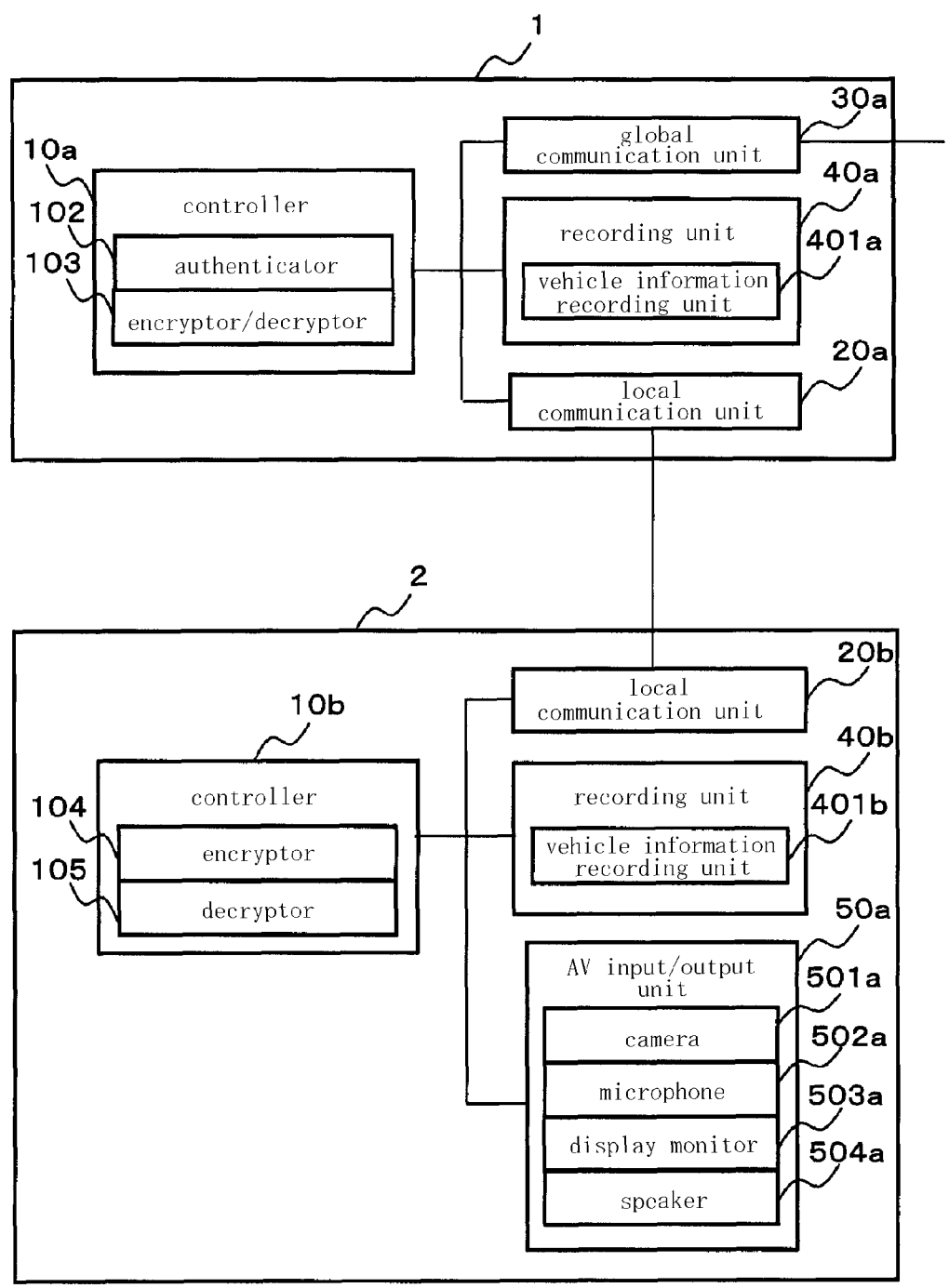
FIG. 3 is a block diagram illustrating a structure of a communication system according to an exemplary embodiment 3 of the present invention.

FIG. 3 is a block diagram illustrating a structure of a communication system according to an exemplary embodiment 3 of the present invention. The communication system includes structural elements similar to those of the exemplary embodiment 2 illustrated in FIG. 2. In addition to these structural elements, the controller 10a of the vehicle mounted server device 1 further includes an encryptor/decryptor 103, and the controller 10b of the vehicle mounted device 2 further includes an encryptor 104 and a decryptor 105. Any other structural elements are similar to those illustrated in FIG. 2. The similar structural elements will not be described again but are simply shown with the same reference symbols.

An operation of the communication system according to the exemplary embodiment 3 is described in detail below. The encryptor 104 of the controller 10b in the vehicle mounted device 2 encrypts a header region representing data type and characteristics of the first data using the unique information recorded in the vehicle information recorder 401b of the recording unit 40b. The local communication unit 20b transmits the encrypted first data to the vehicle mounted server device 1. The first data thus encrypted is called a first data (encrypted).

The controller 10a of the vehicle mounted server device 1 stores the received first data (encrypted) in the recording unit 40a. The encryptor/decryptor 103 of the controller 10a decrypts the first data (encrypted) using the unique information recorded in the vehicle information recorder 401a of the recording unit 40a. The encryptor/decryptor 103 stores the decrypted original data (first data) in the recording unit 40a. The first data (encrypted) and its original data, the first data, are stored in the recording unit 40a. These data are transmitted by the global communication unit 30a and the local communication unit 20a depending on the status of communication.

The controller 10a of the vehicle mounted server device 1 stores the encrypted data in the recording unit 40a. The encrypted data stored then is the encrypted data received by the global communication unit 30a and the local communication unit 20a or the second data in which a header region is encrypted by the encryptor/decryptor 103 based on the unique information recorded in the vehicle information recorder 401a of the recording unit 40a. Hereinafter, the encrypted second data is called a second data (encrypted). The encrypted data received by the global communication unit 30a and the local communication unit 20a is the second data (encrypted) encrypted in the information communication apparatus 3 and then transmitted and the first data (encrypted) encrypted in the vehicle mounted device 2 and then transmitted.

The encrypted data thus stored in the recording unit 40a is transmitted from the local communication unit 20a to the vehicle mounted device 2.

The decryptor 105 of the controller 10b in the vehicle mounted device 2 decrypts the encrypted data received by the local communication unit 20b using the unique information recorded in the vehicle information recorder 401b of the recording unit 40b, and then stores the decrypted data (original data) in the recording unit 40b.

As described so far, according to the exemplary embodiment 3, wherein the encrypted data is transmitted and received between the vehicle mounted server device 1 and the vehicle mounted device 2, information leak to a third party can be prevented from happening. Another advantage of the exemplary embodiment 3 is reduction of burdens in computing and network communication between the vehicle mounted server device 1 and the vehicle mounted device 2 because the data region of transmitted data to be encrypted is limited to the header region representing the data type and characteristics.

Exemplary Embodiment 4

Figure 4:
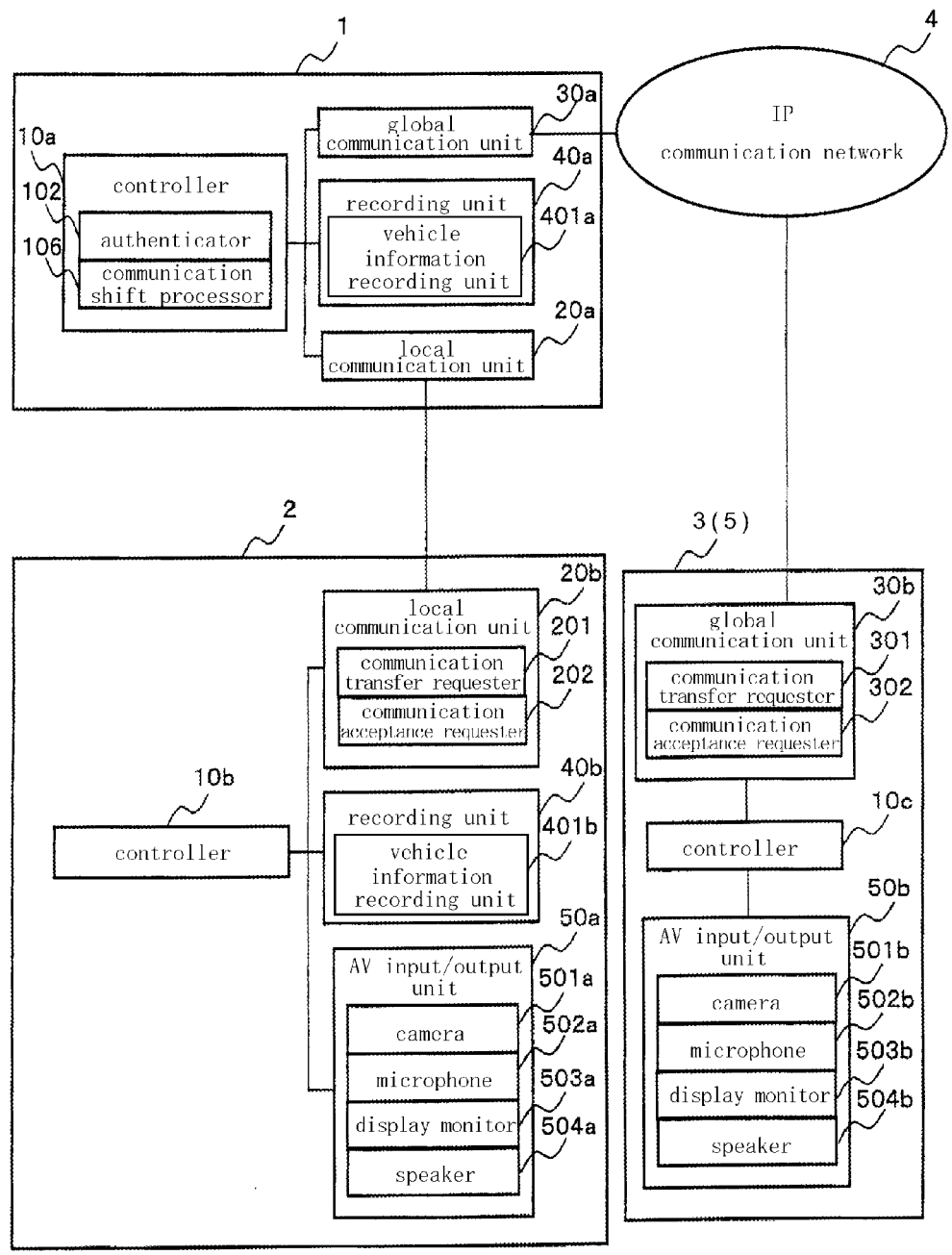
FIG. 4 is a block diagram illustrating a structure of a communication system according to an exemplary embodiment 4 of the present invention.

FIG. 4 is a block diagram illustrating a structure of a communication system according to an exemplary embodiment 4 of the present invention. The communication system includes structural elements similar to those of the exemplary embodiment 1 illustrated in FIG. 1. However, there are differences; the information communication apparatus 3 is limited to a mobile telephone terminal 5, the controller 10a of the vehicle mounted server device 1 further includes an authenticator 102 and a communication shift processor 106, the recording unit 40a of the vehicle mounted server device 1 further includes a vehicle information recorder 401a, the local communication unit 20b of the vehicle mounted device 2 further includes a communication transfer requester 201 and a communication acceptance requester 202, the recording unit 40b of the vehicle mounted device 2 further includes a vehicle information recorder 401b, and the global communication unit 30b of the information communication apparatus 3 (mobile telephone terminal 5) further includes a communication transfer requester 301 and a communication acceptance requester 302. Any other structural elements are similar to those described in the exemplary embodiment 1 (FIG. 1). The similar structural elements will not be described again but are simply shown with the same reference symbols. An operation of the communication system according to the exemplary embodiment 4 is described in detail below.

[First Communication Transfer Operation]

During the network communication between the vehicle mounted server device 1 and the vehicle mounted device 2, the communication transfer requester 201 of the local communication unit 20b in the vehicle mounted device 2 transmits a request to shift the communication currently ongoing between the vehicle mounted device 2 and the vehicle mounted server device 1 to communication between the vehicle mounted server device 1 and the mobile communication terminal 5 (hereinafter, called first communication transfer request) to the vehicle mounted server device 1. The communication transfer requester 201 carries out the requested operation based on instructions from the controller 10b.

When the local communication unit 20a of the vehicle mounted server device 1 receives the first communication transfer request from the vehicle mounted device 2, the communication shift processor 106 of the controller 10a retains the communication currently ongoing with the vehicle mounted device 2 in the local communication unit 20a, while establishing connection with the mobile telephone terminal 5 via the IP communication network 4 in the global communication unit 30a. Then, the communication shift processor 106 shifts the retained communication with the vehicle mounted device 2 to communication with the mobile telephone terminal 5. As soon as the communication shift is completed, the communication shift processor 106 terminates the connection with the vehicle mounted device 2.

[Second Communication Transfer Operation]

During the network communication between the vehicle mounted server device 1 and the mobile telephone terminal 5, the communication transfer requester 301 of the global communication unit 30b in the mobile telephone terminal 5 transmits a request to shift the communication currently ongoing between the mobile telephone terminal 5 and the vehicle mounted server device 1 to communication between the vehicle mounted device 2 and the vehicle mounted server device 1 (hereinafter, called second communication transfer request) to the vehicle mounted server device 1. The communication transfer requester 301 carries out the transmitted request based on instructions from the controller 10c.

When the global communication unit 30a of the vehicle mounted server device 1 receives the second communication transfer request from the mobile telephone terminal 5, the communication shift processor 106 of the controller 10a retains the communication currently ongoing with the mobile telephone terminal 5 in the global communication unit 30a, while establishing connection with the vehicle mounted device 2 in the local communication unit 20a. Then, the communication shift processor 106 shifts the retained communication with the mobile telephone terminal 5 to the communication with the vehicle mounted device 2. As soon as the communication shift is completed, the communication shift processor 106 terminates the connection with the mobile telephone terminal 5.

[First Communication Transfer Operation]

During the network communication between the vehicle mounted server device 1 and the vehicle mounted device 2, the communication acceptance requester 302 of the global communication unit 30b in the mobile telephone terminal 5 transmits a request to shift the communication currently ongoing between the vehicle mounted server device 1 and the vehicle mounted device 2 to communication between the vehicle mounted server device 1 and the mobile telephone terminal 5 (hereinafter, called first communication transfer request) to the vehicle mounted server device 1. The communication acceptance requester 302 carries out the transmitted request based on instructions from the controller 10c.

When the global communication unit 30a of the vehicle mounted server device 1 receives the first communication transfer request from the mobile telephone terminal 5, the communication shift processor 106 of the controller 10a retains the communication currently ongoing with the vehicle mounted device 2 in the local communication unit 20a, and then shifts the retained communication with the vehicle mounted device 2 via the IP communication network 4 to the communication with the mobile telephone terminal 5 via the global communication unit 30a. Then, the communication shift processor 106 terminates the connection with the vehicle mounted device 2 in the local communication unit 20a.

[Second Communication Transfer Operation]

During the network communication between the vehicle mounted server device 1 and the mobile telephone terminal 5, the communication acceptance requester 202 of the local communication unit 20b in the vehicle mounted device 2 transmits a request to shift the communication currently ongoing between the vehicle mounted server device 1 and the mobile telephone terminal 5 to communication between the vehicle mounted server device 1 and the vehicle mounted device 2 (hereinafter, called second communication transfer request) to the vehicle mounted server device 1. The communication acceptance requester 202 carries out the transmitted request based on instructions from the controller 10b.

When the local communication unit 20a of the vehicle mounted server device 1 receives the second communication transfer request from the vehicle mounted device 2, the communication shift processor 106 of the controller 10a retains the communication currently ongoing with the mobile telephone terminal 5 in the global communication unit 30a, and then shifts the retained communication with the mobile telephone terminal 5 to communication with the vehicle mounted device 2. As soon as the communication shift is completed, the communication shift processor 106 terminates the connection with the mobile telephone terminal 5.

As described so far, the technical characteristic of the exemplary embodiment 4 is to shift the communication between the vehicle mounted device 2 and the vehicle mounted server device 1 to the communication between the mobile telephone terminal 5 and the vehicle mounted server device 1 to continue the communication using the mobile telephone terminal 5 outside of the vehicle through the operation of the vehicle mounted device 2 or the mobile telephone terminal 5. When a user returns to the vehicle, he can reestablish the communication between the vehicle mounted device 2 and the vehicle mounted server device 1 by operating the vehicle mounted device 2 or the mobile telephone terminal 5.

Exemplary Embodiment 5

FIG. 5 is a block diagram illustrating a structure of a communication system according to an exemplary embodiment 5 of the present invention. The communication system includes structural elements similar to those of the exemplary embodiment 2 illustrated in FIG. 2. However, there are differences; the controller 10a of the vehicle mounted server device 1 further includes an image quality adjuster 107a and a sound quality adjuster 108a, the recording unit 40a of the vehicle mounted server device 1 further includes a terminal information recorder 402, and the controller 10b of the vehicle mounted device 2 further includes an image quality adjuster 107b and a sound quality adjuster 108b. Any other structural elements are similar to those illustrated in FIG. 2. The similar structural elements will not be described again but are simply shown with the same reference symbols.

An operation of the communication system according to the exemplary embodiment 5 is described in detail below. The image quality adjuster 107a and the sound quality adjuster 108a of the controller 10a in the vehicle mounted server device 1 converts the bit rate of the second data stored in the recording unit 40a based on a performance information of the vehicle mounted device 2 recorded in the terminal information recorder 402 of the recording unit 40a. The second data in which the bit rate has been converted is transmitted from the local communication unit 20a to the vehicle mounted device 2.

The controller 10b of the vehicle mounted device 2 outputs the second data received from the local communication unit 20b to the display monitor 503a and the speaker 504a of the AV input/output unit 50a. Then, the image quality adjuster 107b of the controller 10b monitors whether or not drop frame occurs in the second data (more specifically, second video data) outputted to the display monitor 503a of the AV input/output unit 50a to be converted into images there. Having determined that the drop frame occurred, the image quality adjuster 107b degrades the image quality of the second data (second video data) and outputs the resulting second data to the display monitor 503a of the AV input/output unit 50a. The sound quality adjuster 108b monitors whether or not interrupt of voice or sound occurs in the second data (more specifically, second audio data) outputted to the speaker 504a of the AV input/output unit 50a to be converted into voice or sound there. Having determined that the interrupt of sound or voice occurred, the sound quality adjuster 108b degrades the sound quality of the second data (second audio data) and outputs the resulting second data to the speaker 504a of the AV input/output unit 50a.

As described so far, the technical advantages of the exemplary embodiment 5 are; the status of communication and the performance of a communication terminal to which data is distributed can be taken into account in the stream distribution of images and sound, and disturbed images can be lessened and interrupt of sound or voice can be prevented from happening through the operation of the terminal which receives data.

Exemplary Embodiment 6

Figure 6:
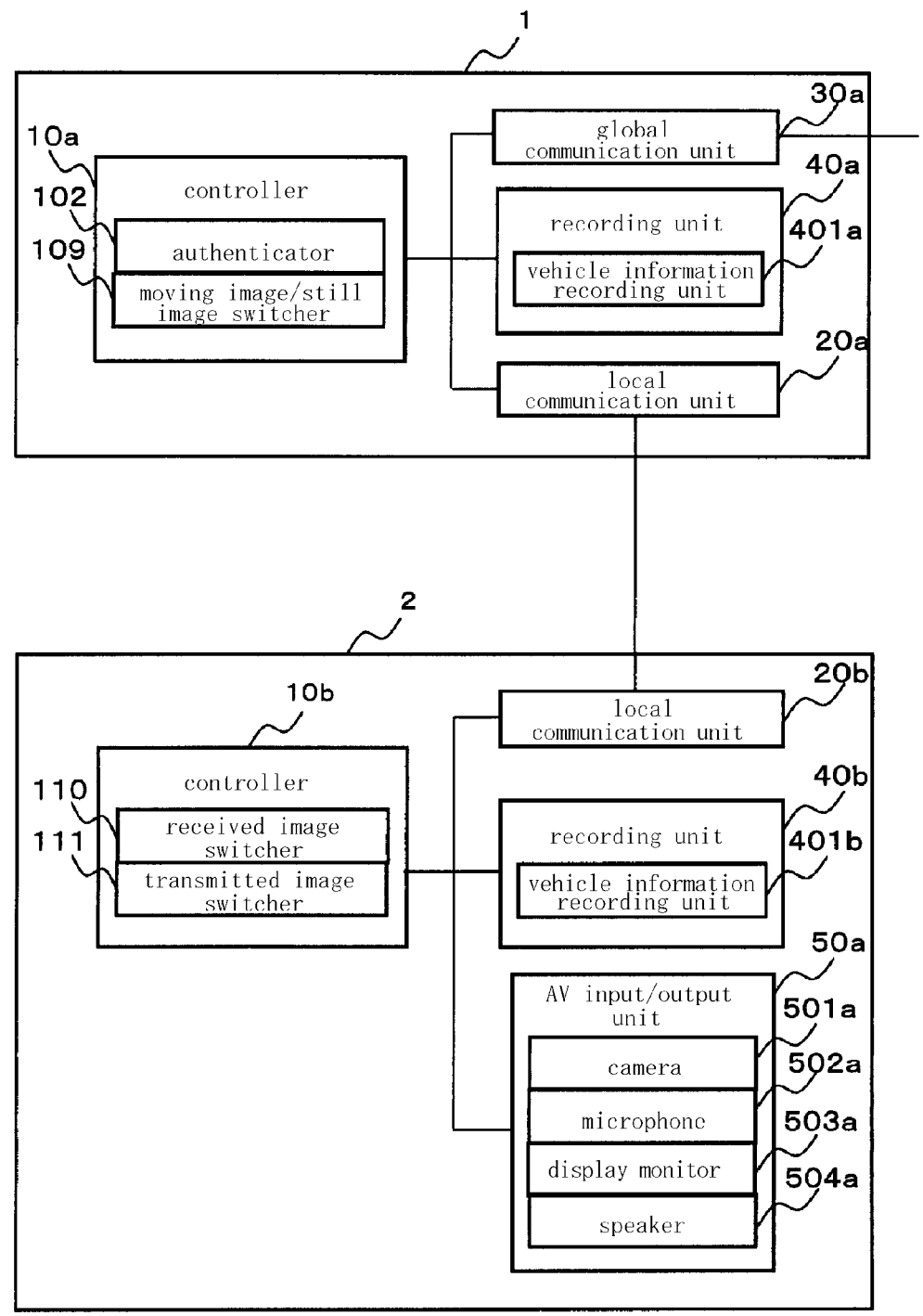
FIG. 6 is a block diagram illustrating a structure of a communication system according to an exemplary embodiment 6 of the present invention.

FIG. 6 is a block diagram illustrating a structure of a communication system according to an exemplary embodiment 6 of the present invention. The communication system includes structural elements similar to those of the exemplary embodiment 2 illustrated in FIG. 2. However, there are differences; the controller 10a of the vehicle mounted server device 1 further includes a moving image/still image switcher 109, and the controller 10b of the vehicle mounted device 2 further includes a received image switcher 110 and a transmitted image switcher 111. Any other structural elements are similar to those illustrated in FIG. 2. The similar structural elements will not be described again but are simply shown with the same reference symbols. An operation of the communication system according to the exemplary embodiment 6 is described in detail below. The operation of the communication system includes the following first-third operations.

[First Operation]

The controller 10b of the vehicle mounted device 2 data-processes the video signals and audio signals supplied from the camera 501a and the microphone 502a of the AV input/output unit 50a to generate the first data, and the local communication unit 20b transmits the generated first data to the vehicle mounted server device 1 in real time.

In the event that the communication status between the vehicle mounted device 2 and the vehicle mounted server device 1 is deteriorated while the processing described in the preceding paragraph is carried out, the transmitted image switcher 111 of the controller 10b in the vehicle mounted device 2 suspends the transmission of the first data by the local communication unit 20b and then reads still image data recorded in the recording unit 40b. The transmitted image switcher 111 then transmits the read still image data to the vehicle mounted server device 1 by way of the local communication unit 20b. When the communication status is back to normal, the transmitted image switcher 111 restarts the transmission of the first data by the local communication unit 20b. Such a bad communication status that requires the data transmission switchover occurs, for example, while a vehicle is travelling in a tunnel.

[Second Operation]

The controller 10b of the vehicle mounted device 2 supplies the second video data included in the second data distributed in real time from the vehicle mounted server device 1 to the display monitor 503a of the AV input/output unit 50a to be displayed thereon.

In the event that the communication status between the vehicle mounted device 2 and the vehicle mounted server device 1 is deteriorated while the processing described in the preceding paragraph is carried out, the received image switcher 110 of the controller 10b in the vehicle mounted device 2 suspends the display of the second data on the display monitor 503a and then reads the still image data recorded in the recording unit 40b. The received image switcher 110 then transmits the read still image data to the display monitor 503a to be displayed thereon. When the communication status is back to normal, the received image switcher 110 suspends the display of the still image data on the display monitor 503a to restart the display of the second video data thereon.

[Third Operation]

The controller 10a of the vehicle mounted server device 1 stream-distributes the first and second data stored in the recording unit 40a by way of the global communication unit 30a and the local communication unit 20a.

In the event that the communication status of the vehicle mounted server device 1 is deteriorated while the processing described in the preceding paragraph is carried out, the moving image/still image switcher 109 of the controller 10a in the vehicle mounted server device 1 suspends the transmission of the first and second data by way of the global communication unit 30a and the local communication unit 20a and reads the still image data recorded in the recording unit 40a. The moving image/still image switcher 109 then transmits the read still image data by way of the global communication unit 30a and the local communication unit 20a. When the communication status is back to normal, the moving image/still image switcher 109 suspends the transmission of the still image data to restart the transmission of the first and second data.

As described so far, the technical advantages of the exemplary embodiment 6 are; be able to reduce burdens in communication by selecting which of the first and second data and the still image data should be transmitted depending on the communication status, and be able to lessen disturbance of a display screen by selecting which of the first and second data and the still image data should be displayed depending on the communication status.

Exemplary Embodiment 7

Figure 7:
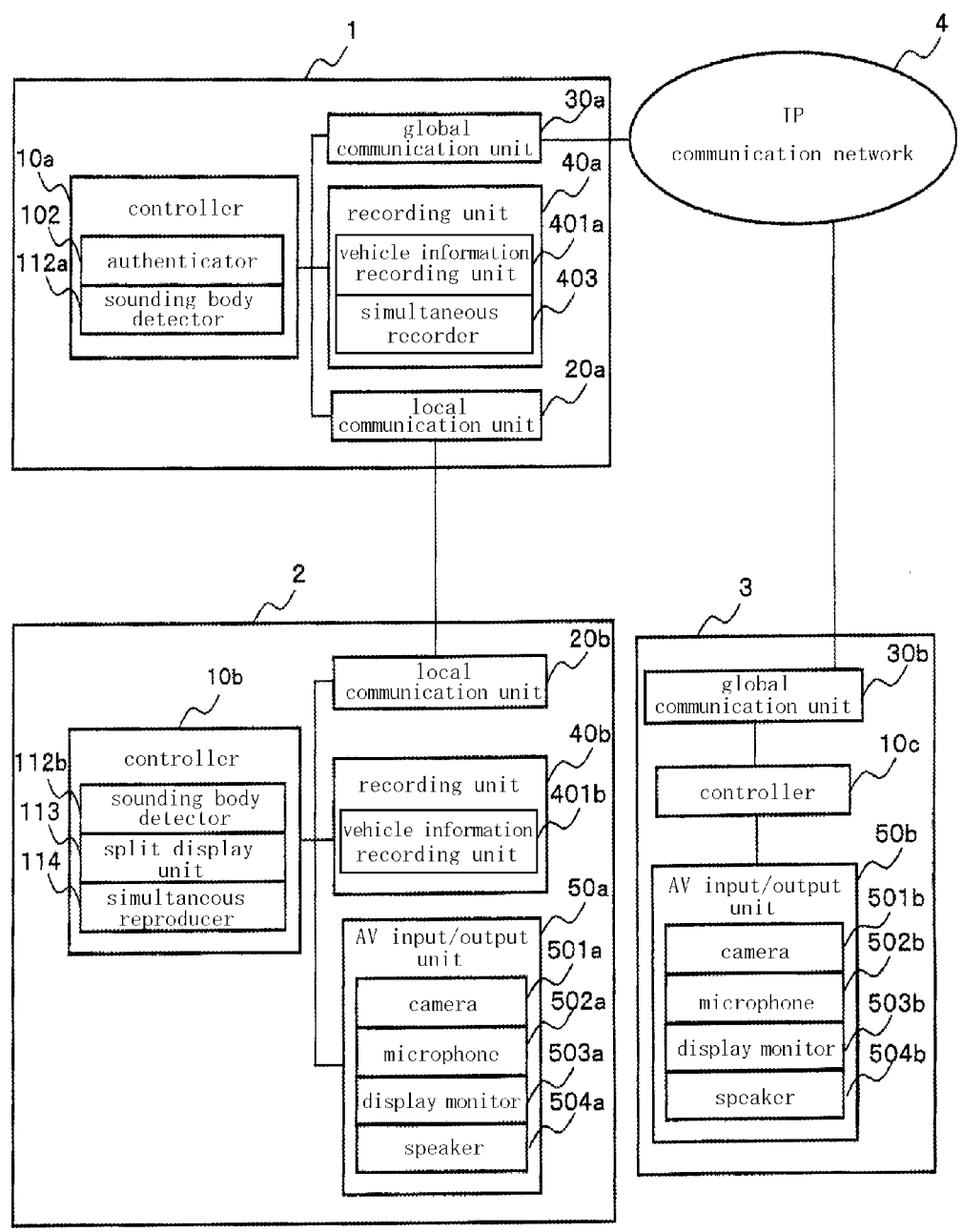
FIG. 7 is a block diagram illustrating a structure of a communication system according to an exemplary embodiment 7 of the present invention.

FIG. 7 is a block diagram illustrating a structure of a communication system according to an exemplary embodiment 7 of the present invention. The communication system includes structural elements similar to those of the exemplary embodiment 1 illustrated in FIG. 1. However, there are differences; the controller 10a of the vehicle mounted server device 1 further includes an authenticator 102 and a sounding body detector 112a, the recording unit 40a of the vehicle mounted server device 1 further includes a vehicle information recorder 401a and a simultaneous recorder 403, the controller 10b of the vehicle mounted device 2 further includes a sounding body detector 112b, a split display unit 113, and a simultaneous reproducer 114, and the recording unit 40b of the vehicle mounted device 2 further includes a vehicle information recorder 401b. Any other structural elements are similar to those illustrated in FIG. 1. The similar structural elements will not be described again but are simply shown with the same reference symbols.

An operation of the communication system according to the exemplary embodiment 7 is described in detail below. The controller 10c of the information communication apparatus 3 data-processes the video signals and audio signals supplied from the camera 501b and the microphone 502b of the AV input/output unit 50b to generate the second data. The generated second data is transmitted in real time by the global communication unit 30b to the vehicle mounted server device 1 through the IP communication network 4. Another information communication apparatus 3 similarly transmits the second data to the vehicle mounted server device 1 in real time.

The controller 10a of the vehicle mounted server device 1 stores the received second data in the simultaneous recorder 403 of the recording unit 40a. The sounding body detector 112a of the controller 10a analyzes the second data stored in the recording unit 40a to generate information which identifies the sounding body of the second audio data constituting the second data (hereinafter, called sounding body information), and appends the generated sounding body information to the second data. The local communication unit 20a transmits the second data including the sounding body information to the vehicle mounted device 2.

The controller 10b of the vehicle mounted device 2 simultaneously reproduces a plurality of the second video data included in a plurality of the second data (the sounding body information is already appended to a part or all of the second data) received by the local communication unit 20b using the simultaneous reproducer 114. The controller 10b splits the second video data reproduced at a time into a plurality of second video data (split) using the split display unit 113. The controller 10b further identifies the second video data (split) to which the sounding body information is appended based on the sound body information included in the second data (split) detected by the sounding body detector 112b. Then, the controller 10b generates a second video data (synthesized) in which the plurality of second video data (split) are arranged in parallel and outputs the generated second video data (synthesized) to the display monitor 503a of the AV input/output unit 50a. The controller 10b generates the second video data (synthesized) so that, of the plurality of second video data (split), the second video data (split) including the sounding body information is displayed in an enlarged manner.

As described so far, the exemplary embodiment 7 is technically advantageous in that a plurality of video/audio data can be recorded and reproduced at a time in real time, and a plurality of video data (split) can be synthesized into one video data (synthesized) and then displayed. The exemplary embodiment 7 is further technically advantageous in that, when a plurality of video data (split) can be synthesized into one video data (synthesized) and then displayed, the video data (split) in which the sounding body is identified is displayed in a magnified view so that the sounding body can be more clearly visually confirmed.

Exemplary Embodiment 8

FIG. 8 is a block diagram illustrating a structure of a communication system according to an exemplary embodiment 8 of the present invention. The communication system includes structural elements similar to those of the exemplary embodiment 1 illustrated in FIG. 1. However, there are differences; the recording unit 40a of the vehicle mounted server device 1 further includes a vehicle information recorder 401a, a simultaneous recorder 403, and a time information recorder 404, the controller 10b of the vehicle mounted device 2 further includes a split display unit 113, a simultaneous reproducer 114, and a synchronous reproducer 115, and the recording unit 40b of the vehicle mounted device 2 further includes a vehicle information recorder 401b. Any other structural elements are similar to those illustrated in FIG. 1. The similar structural elements will not be described again but are simply shown with the same reference symbols.

An operation of the communication system according to the exemplary embodiment 8 is described in detail below. The controller 10c of the information communication apparatus 3 data-processes the video signals and audio signals supplied from the camera 501b and the microphone 502b of the AV input/output unit 50b to generate the second data. The generated second data is transmitted in real time by the global communication unit 30b to the vehicle mounted server device 1 through the IP communication network 4. Another information communication apparatus 3 similarly transmits the second data to the vehicle mounted server device 1 in real time.

The controller 10a of the vehicle mounted server device 1 stores the received second data in the simultaneous recorder 403 of the recording unit 40a. In recording the data, the controller 10a defines time points when the recording (imaging) of the second data starts and ends using the time information recorder 404 of the recording unit 40a. Then, the controller 10a appends a recording (imaging) start and end time data indicating the defined recording (imaging) start and end time points to the second data and stores the resulting second data in the simultaneous recorder 403. The second data to which the recording (imaging) start and end time data is appended is transmitted by the local communication unit 20a to the vehicle mounted device 2.

The controller 10b of the vehicle mounted device 2 splits a plurality of the second video data included in a plurality of the second data received by the local communication unit 20b into a plurality of second video data (split) using the split display unit 113. The controller 10b then synthesizes the second video data into a single second data (synthesized) in which their data times synchronize with each other using the synchronous reproducer 115 based on the recording (imaging) start and end time data. The controller 10b outputs the second data (synthesized) to the display monitor 503a and the speaker 504a of the AV input/output unit 50a.

As described so far, the exemplary embodiment 8 is technically advantageous in that a plurality of video/audio data are synthesized into a single data (synthesized) in which the recording (imaging) start and end time points are asynchronous but the data times are synchronous, so that the plurality of data can be synchronously reproduced.

Exemplary Embodiment 9

Figure 9:
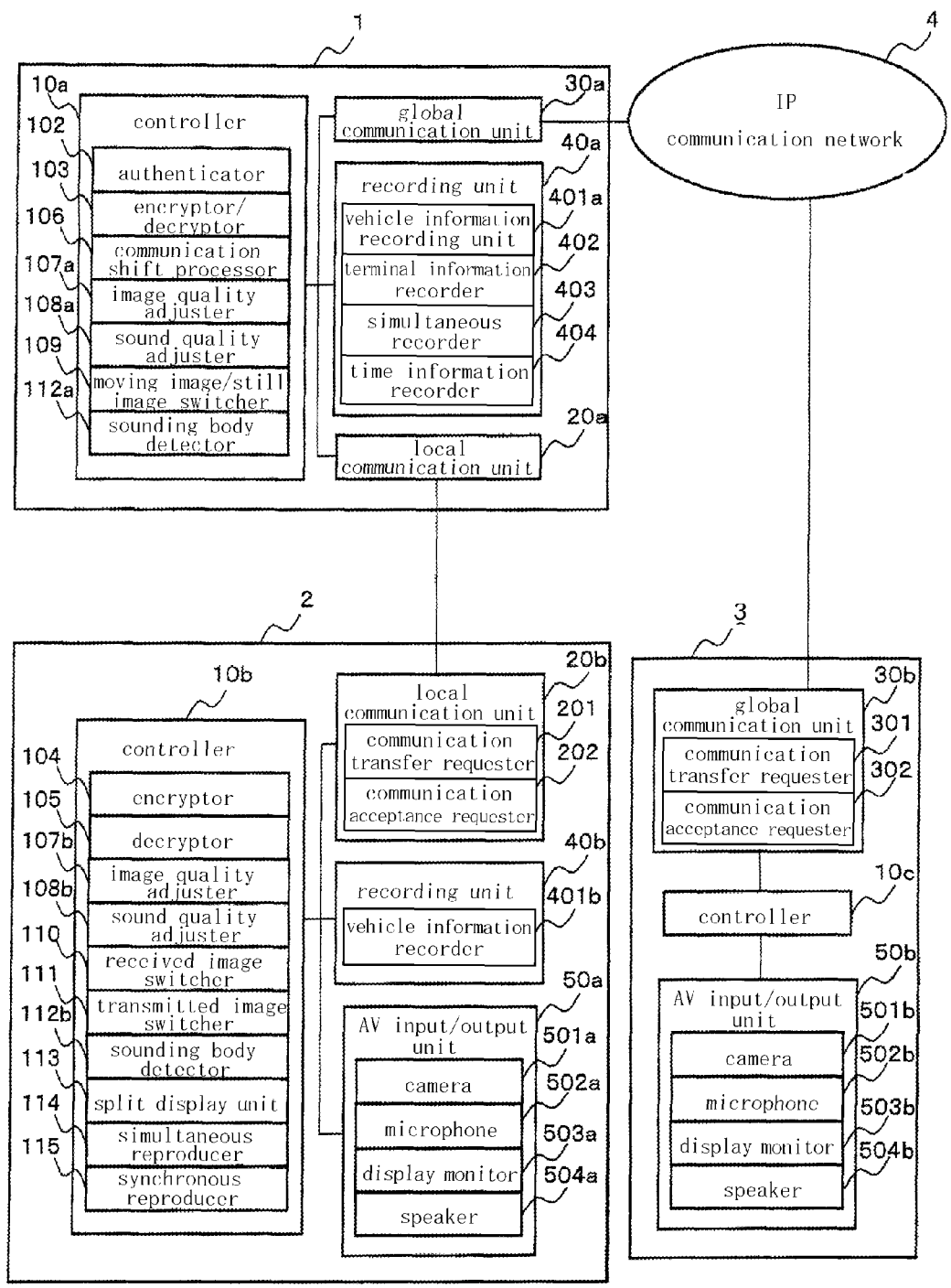
FIG. 9 is a block diagram illustrating a structure of a communication system according to an exemplary embodiment 9 of the present invention.

FIG. 9 is a block diagram illustrating a structure of a teleconference system according to an exemplary embodiment 9 of the present invention. The teleconference system to be used in a vehicle includes structural elements similar to those of the exemplary embodiments 1-8 illustrated in FIGS. 1-8, and the information communication apparatus 3 is limited to a teleconference terminal 6. Any other structural elements are similar to those illustrated in FIGS. 1-8. The similar structural elements will not be described again but are simply shown with the same reference symbols.

An operation of the teleconference system according to the exemplary embodiment 9, which is similar to any of the operations according to the exemplary embodiments 1-8 illustrated in FIGS. 1-8, is omitted in the description given below.

According to the exemplary embodiment 9, a teleconference which ensures less network burdens and better security by using encrypted data can be held between one or a plurality of vehicle mounted devices and one or a plurality of information communication apparatuses connected to an currently available network such as telephone network or IP communication network to transmit and receive data therebetween. Other technical advantages of the exemplary embodiment 9 are; the teleconference can be continued with different devices, disturbance of images and voice or sound can be avoided depending on the communication status of a teleconference and performance levels of terminal devices, distribution of moving images can be shifted to distribution of still images depending on the communication status of a teleconference to alleviate burdens in communication, a plurality of video data and audio data associated with a teleconference can be recorded and reproduced in real time at a time, a sounding body can be enlarged to be more clearly viewed by displaying a plurality of video data associated with a teleconference in a split manner, and a plurality of video data associated with a teleconference can be reconfigured and synchronously reproduced in the case where their recording (imaging) start and end times are not synchronous.

INDUSTRIAL APPLICABILITY

As described so far, a vehicle mounted device, a vehicle mounted server device, and a communication system according to the present invention have such advantages that they can communicate with one another through a network currently available such as telephone network or IP communication network with high security by authenticating the vehicle mounted device and using encrypted/decrypted data, lessen burdens in network communication, shift communication to and from different devices, and synchronously distribute a plurality of video data and audio data. The vehicle mounted device, vehicle mounted server device, and communication system according to the present invention are advantageous devices in, for example, an in-vehicle teleconference system.

What is claimed is:

1. A vehicle mounted device mounted in a vehicle, comprising:
an AV input/output unit including at least a camera, a microphone, a display monitor, and a speaker;
a first local communication unit for transmitting a first data including at least one of a first video data and a first audio data generated by the AV input/output unit to a server device, the first local communication unit further receiving a second data including at least one of a second video data and a second audio data from the server device;
a first recording unit for recording therein the first data and the second data; and
a first controller for controlling the AV input/output unit, the first recording unit, and the first local communication unit,
wherein the first recording unit further records therein a unique information which can identify the vehicle or a user of the vehicle, and the first local communication unit transmits the unique information to the server device, and
said server device comprises:
a second local communication unit;
a global communication unit to be constantly connected to a network including at least one of telephone network and IP communication network to transmit and receive data;
a second recording unit for recording therein the first and second data; and
a second controller for controlling the second recording unit, the global communication unit, and the second local communication unit,
wherein the second controller includes a communication controller, and the communication controller carries out the following processing steps:
receive the second data from an information communication apparatus connected through the network by way of the global communication unit and record the received second data in the second recording unit;
identify the vehicle mounted device based on the unique information received by the second local communication unit and record the first data of the vehicle mounted device received by the second local communication unit in the second recording unit;
read the first data from the second recording unit and identify the vehicle mounted device relevant to the read first data, and then transmit the read first data to the information communication apparatus by way of the global communication unit; and
read the second data from the second recording unit and transmit the read second data to the identified vehicle mounted device by way of the second local communication unit.

2. The vehicle mounted device as claimed in claim 1, wherein
the first local communication unit receives a communication addressee information indicating a communication addressee uniquely assigned to the vehicle mounted device from the server device, and
the first local communication unit imparts the communication addressee information to the first data to be transmitted to the server device.

3. The vehicle mounted device as claimed in claim 1, wherein the unique information includes at least one of a car registration number plate information and a car number plate information.

4. The vehicle mounted device as claimed in claim 1, wherein the first controller includes an encryptor for encrypting the first data using the unique information recorded in the first recording unit.

5. The vehicle mounted device as claimed in claim 4, wherein the encryptor selectively encrypts a data region of the first data where an information indicating data type and characteristics of the first data is stored.

6. The vehicle mounted device as claimed in claim 1, wherein the second data is encrypted by an encryption technique similar to the first data, and the first controller further includes a decryptor for decrypting the second data using the unique information recorded in the first recording unit.

7. The vehicle mounted device as claimed in claim 1, wherein the first data includes the first video data, the second data includes the second video data, and the first controller further includes a first image quality adjuster for changing image qualities of the first and second video data.

8. The vehicle mounted device as claimed in claim 1, wherein the first data includes the first audio data, the second data includes the second audio data, and the first controller further includes a first sound quality adjuster for changing sound qualities of the first and second audio data.

9. The vehicle mounted device as claimed in claim 1, wherein
the second data includes the second video data, and
the first controller further includes a received image switcher, the received data changer storing a first still image data and outputting the second data read from the first recording unit to the AV input/output unit while switching to and from the second video data included in the second data and the first still image data depending on needs.

10. The vehicle mounted device as claimed in claim 1, wherein
the first data includes the first video data, and
the first controller further includes a transmitted image switcher, the transmitted data changer storing a second still image data and outputting the first data to the server device by way of the first local communication unit while switching to and from the first video data included in the first data and the second still image data depending on needs.

11. The vehicle mounted device as claimed in claim 1, wherein
the first data includes the first video data, and the second data includes the second video data, and
the first controller further includes:
a simultaneous reproducer for simultaneously reproducing a plurality of the first and second video data respectively included in the first and second data recorded in the first recording unit; and
a split display unit for synthesizing the plurality of the first and second video data simultaneously reproduced by the simultaneous reproducer into a synthesized video data which can be displayed on the display monitor of the AV input/output unit in a split manner.

12. The vehicle mounted device as claimed in claim 11, wherein the second data includes the second audio data, and the first controller further includes a first sounding body detector, the first sounding body detector analyzing the second audio data to identify a sounding body of the analyzed second audio data.

13. The vehicle mounted device as claimed in claim 2, wherein the communication controller transmits the communication addressee information to the vehicle mounted device by way of the second local communication unit, and the communication controller identifies the vehicle mounted device based on the communication addressee information imparted to the first data.

14. The vehicle mounted device as claimed in claim 1, wherein the second controller includes a communication selector, and, when the second local communication unit is connected to the vehicle mounted device and the global communication unit is connected to the information communication apparatus to allow communication therebetween, the communication selector arbitrarily selects one of communication with the vehicle mounted device and communication with the information communication apparatus.

15. The vehicle mounted device as claimed in claim 1, wherein the second recording unit records the unique information received from the vehicle mounted device, and the second controller includes an encryptor/decryptor, the encryptor/decryptor decrypting the first data recorded in the second recording unit using the unique information recorded in the second recording unit, the encryptor/decryptor further encrypting the second data recorded in the second recording unit using the unique information recorded in the second recording unit.

16. The vehicle mounted device as claimed in claim 1, wherein the first data includes the first video data, the second data includes the second video data, and the second controller further includes a second image quality adjuster for changing image qualities of the first and second video data.

17. The vehicle mounted device as claimed in claim 1, wherein the first data includes the first audio data, the second data includes the second audio data, and the second controller further includes a second sound quality adjuster for changing sound qualities of the first and second audio data.

18. The vehicle mounted device as claimed in claim 1, wherein the second recording unit further records therein a performance information indicating a performance of the vehicle mounted device and a performance of the information communication apparatus communicatably connected thereto through the network.

19. The vehicle mounted device as claimed in claim 1, wherein the first data includes the first video data, the second data includes the second video data, and the second controller further includes a moving image/still image switcher, the moving image/still image selector storing therein a third still image data, and reading the second data from the second recording unit and transmitting the read second data to the vehicle mounted device by way of the second local communication unit while switching to and from the second video data included in the second data and the third still image data depending on needs, the moving image/still image switcher further storing therein a fourth still image data, and reading the first data from the second recording unit and transmitting the read first data to the information communication apparatus by way of the global communication unit while switching to and from the first video data included in the first data and the fourth still image data depending on needs.

20. The vehicle mounted device as claimed in claim 1, wherein the second recording unit records a plurality of the first and second data at a time, and the second controller further includes a second sounding body detector, the second sounding body detector analyzing a plurality of the first and second audio data included in the plurality of the first and second data recorded in the second recording unit to identify a sounding body of the analyzed the first and second audio data.

21. A communication system comprising:
a plurality of vehicle mounted devices, each of said plurality of vehicle mounted devices comprising:
an AV input/output unit including at least a camera, a microphone, a display monitor, and a speaker;
a first local communication unit for transmitting a first data including at least one of a first video data and a first audio data generated by the AV input/output unit to a server device, the first local communication unit further receiving a second data including at least one of a second video data and a second audio data from the server device;
a first recording unit for recording therein the first data and the second data; and
a first controller for controlling the AV input/output unit, the first recording unit, and the first local communication unit,
wherein the first recording unit further records therein a unique information which can identify the vehicle or a user of the vehicle, and the first local communication unit transmits the unique information to the server device; and
each server device comprising:
a second local communication unit;
a global communication unit to be constantly connected to a network including at least one of telephone network and IP communication network to transmit and receive data;
a second recording unit for recording therein the first and second data; and
a second controller for controlling the second recording unit, the global communication unit, and the second local communication unit,
wherein the second controller includes a communication controller, and the communication controller carries out the following processing steps:
receive the second data from an information communication apparatus connected through the network by way of the global communication unit and record the received second data in the second recording unit;
identify the vehicle mounted device based on the unique information received by the second local communication unit and record the first data of the vehicle mounted device received by the second local communication unit in the second recording unit;
read the first data from the second recording unit and identify the vehicle mounted device relevant to the read first data, and then transmit the read first data to the information communication apparatus by way of the global communication unit;
read the second data from the second recording unit and transmit the read second data to the identified vehicle mounted device by way of the second local communication unit; and
wherein the second controller includes a communication selector, and, when the second local communication unit is connected to the vehicle mounted device and the global communication unit is connected to the information communication apparatus to allow communication therebetween, the communication selector arbitrarily selects one of communication with the vehicle mounted device and communication with the information communication apparatus; and a plurality of information communication apparatuses connected to the global communication unit through the network to enable data transmission and reception therebetween, wherein communication transfer requesters for transmitting a first request to the server device are respectively provided in the vehicle mounted devices and the information communication apparatuses, the first request being requested by one of the communication transfer requesters to shift communication currently ongoing between the server device and the vehicle mounted device or the information communication apparatus provided with the one of the communication transfer requesters to communication between the server device and the other vehicle mounted device or the other information communication apparatus, and the communication selector of the server device which receives the first request selects one of communication with the vehicle mounted device and communication with the information communication apparatus depending on the first request.

22. A communication system, comprising:

a plurality of vehicle mounted devices, each of said plurality of vehicle mounted devices comprising:
an AV input/output unit including at least a camera, a microphone, a display monitor, and a speaker;
a first local communication unit for transmitting a first data including at least one of a first video data and a first audio data generated by the AV input/output unit to a server device, the first local communication unit further receiving a second data including at least one of a second video data and a second audio data from the server device;
a first recording unit for recording therein the first data and the second data; and
a first controller for controlling the AV input/output unit, the first recording unit, and the first local communication unit,
wherein the first recording unit further records therein a unique information which can identify the vehicle or a user of the vehicle, and the first local communication unit transmits the unique information to the server device;

each server device comprising:
a second local communication unit;
a global communication unit to be constantly connected to a network including at least one of telephone network and IP communication network to transmit and receive data;
a second recording unit for recording therein the first and second data; and
a second controller for controlling the second recording unit, the global communication unit, and the second local communication unit,
wherein the second controller includes a communication controller, and the communication controller carries out the following processing steps:
receive the second data from an information communication apparatus connected through the network by way of the global communication unit and record the received second data in the second recording unit;
identify the vehicle mounted device based on the unique information received by the second local communication unit and record the first data of the vehicle mounted device received by the second local communication unit in the second recording unit;
read the first data from the second recording unit and identify the vehicle mounted device relevant to the read first data, and then transmit the read first data to the information communication apparatus by way of the global communication unit;
read the second data from the second recording unit and transmit the read second data to the identified vehicle mounted device by way of the second local communication unit; and
wherein the second controller includes a communication selector, and, when the second local communication unit is connected to the vehicle mounted device and the global communication unit is connected to the information communication apparatus to allow communication therebetween, the communication selector arbitrarily selects one of communication with the vehicle mounted device and communication with the information communication apparatus; and a plurality of information communication apparatuses connected to the global communication unit through the network to enable data transmission and reception therebetween, wherein communication acceptance requesters for transmitting a second request to the server device are respectively provided in the vehicle mounted devices and the information communication apparatuses, the second request being requested by one of the communication acceptance requesters to shift communication currently ongoing between the server device and the other vehicle mounted device or the other information communication apparatus to communication between the server device and the vehicle mounted device or the information communication apparatus provided with the one of the communication acceptance requesters, and the communication selector of the server device which receives the second request selects one of communication with the vehicle mounted device and communication with the information communication apparatus depending on the second request.

23. The communication system as claimed in claim 21, wherein the information communication apparatus is a mobile telephone terminal.

24. The communication system as claimed in claim 22, wherein the information communication apparatus is a mobile telephone terminal.

25. The communication system as claimed in claim 21, wherein the information communication apparatus is a teleconference terminal.

26. The communication system as claimed in claim 22, wherein the information communication apparatus is a teleconference terminal.

27. A communication system communication system, comprising:
a vehicle mounted device, comprising:
an AV input/output unit including at least a camera, a microphone, a display monitor, and a speaker;
a first local communication unit for transmitting a first data including at least one of a first video data and a first audio data generated by the AV input/output unit to a server device, the first local communication unit further receiving a second data including at least one of a second video data and a second audio data from the server device;
a first recording unit for recording therein the first data and the second data; and a first controller for controlling the AV input/output unit, the first recording unit, and the first local communication unit,
wherein the first recording unit further records therein a unique information which can identify the vehicle or a user of the vehicle,
the first local communication unit transmits the unique information to the server device,
the first local communication unit receives a communication addressee information indicating a communication addressee uniquely assigned to the vehicle mounted device from the server device, and
the first local communication unit imparts the communication addressee information to the first data to be transmitted to the server device,
the service device comprises:
a second local communication unit,
a global communication unit to be constantly connected to a network including at least one of telephone network and IP communication network to transmit and receive data;
a second recording unit for recording therein the first and second data; and
a second controller for controlling the second recording unit, the global communication unit, and the second local communication unit,
wherein the second controller includes a communication controller, and the communication controller carries out the following processing steps:
receive the second data from an information communication apparatus connected through the network by way of the global communication unit and record the received second data in the second recording unit;
identify the vehicle mounted device based on the unique information received by the second local communication unit and record the first data of the vehicle mounted device received by the second local communication unit in the second recording unit;
read the first data from the second recording unit and identify the vehicle mounted device relevant to the read first data, and then transmit the read first data to the information communication apparatus by way of the global communication unit; and
read the second data from the second recording unit and transmit the read second data to the identified vehicle mounted device by way of the second local communication unit;
wherein the second recording unit of the server device records therein the unique information, and
the second controller of the server device further includes an authenticator for authenticating the vehicle based on the unique information.

28. A communication system, comprising:
a vehicle mounted device, comprising:
an AV input/output unit including at least a camera, a microphone, a display monitor, and a speaker;
a first local communication unit for transmitting a first data including at least one of a first video data and a first audio data generated by the AV input/output unit to a server device, the first local communication unit further receiving a second data including at least one of a second video data and a second audio data from the server device;
a first recording unit for recording therein the first data and the second data; and
a first controller for controlling the AV input/output unit, the first recording unit, and the first local communication unit,
wherein the first recording unit further records therein a unique information which can identify the vehicle or a user of the vehicle, and
the first local communication unit transmits the unique information to the server device,
the service device comprises:
a second local communication unit;
a global communication unit to be constantly connected to a network including at least one of telephone network and IP communication network to transmit and receive data;
a second recording unit for recording therein the first and second data; and
a second controller for controlling the second recording unit, the global communication unit, and the second local communication unit,
wherein the second controller includes a communication controller, and the communication controller carries out the following processing steps:
receive the second data from an information communication apparatus connected through the network by way of the global communication unit and record the received second data in the second recording unit;
identify the vehicle mounted device based on the unique information received by the second local communication unit and record the first data of the vehicle mounted device received by the second local communication unit in the second recording unit;
read the first data from the second recording unit and identify the vehicle mounted device relevant to the read first data, and then transmit the read first data to the information communication apparatus by way of the global communication unit; and
read the second data from the second recording unit and transmit the read second data to the identified vehicle mounted device by way of the second local communication unit;
wherein the first controller of the vehicle mounted device further includes a synchronous reproducer for synchronously reproducing a plurality of the first and second data based on recording (imaging) start time or recording (imaging) end time information of the first and second video data included in the plurality of the first and second data, and
the second recording unit of the server device further includes a time information recorder for recording the first and second data received by the second local communication unit and the global communication unit with the recording (imaging) start time and recording (imaging) end time information appended thereto.

* * * * *